(12) United States Patent
Jeong et al.

(10) Patent No.: US 12,327,894 B2
(45) Date of Patent: Jun. 10, 2025

(54) APPARATUS FOR CONTROLLING FUEL CELL SYSTEM AND METHOD THEREOF

(71) Applicants: Hyundai Motor Company, Seoul (KR); Kia Corporation, Seoul (KR)

(72) Inventors: Won Sik Jeong, Gyeonggi-do (KR); Jae Gwang Lee, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 372 days.

(21) Appl. No.: 17/973,021

(22) Filed: Oct. 25, 2022

(65) Prior Publication Data

US 2023/0317986 A1    Oct. 5, 2023

(30) Foreign Application Priority Data

Apr. 4, 2022   (KR) .................. 10-2022-0041598

(51) Int. Cl.
| | | |
|---|---|---|
| *H01M 8/04302* | (2016.01) | |
| *H01M 8/04225* | (2016.01) | |
| *H01M 8/04228* | (2016.01) | |
| *H01M 8/04303* | (2016.01) | |
| *H01M 8/04537* | (2016.01) | |

(Continued)

(52) U.S. Cl.
CPC ... *H01M 8/04302* (2016.02); *H01M 8/04225* (2016.02); *H01M 8/04228* (2016.02); *H01M 8/04303* (2016.02); *H01M 8/04619* (2013.01); *H01M 8/0494* (2013.01);
(Continued)

(58) Field of Classification Search
CPC .............. H01M 10/44; H01M 16/006; H01M 8/04225; H01M 8/04228; H01M 8/04302; H01M 8/04303; H01M 8/04619; H01M 8/0494; H01M 8/04955; Y02E 60/50
See application file for complete search history.

(56) References Cited

U.S. PATENT DOCUMENTS 6,616,424 B2   9/2003   Raiser
7,344,788 B2   3/2008   Clingerman et al.
(Continued)

FOREIGN PATENT DOCUMENTS

CN     109616688 A    4/2019
JP       5061555 B2   10/2012
(Continued)

OTHER PUBLICATIONS

Machine translation KR20120060505A (Year: 2012).*

*Primary Examiner* — Victoria H Lynch
(74) *Attorney, Agent, or Firm* — Fox Rothschild LLP

(57) ABSTRACT

An apparatus for controlling a cold start and a cold shutdown (CSD) of a fuel cell system and a method thereof are provided. A monitoring device may individually monitor at least one of an amount of accumulated power and/or an accumulated driving time of one or more fuel cell stacks. A controller may select a representative fuel cell stack among the one or more fuel cell stacks, based on the amount of accumulated power and/or the amount of accumulated driving time, performs a cold start of the representative fuel cell stack, and perform cold starts of the remaining fuel cell stacks, using power of the representative fuel cell stack after the cold start of the selected representative fuel cell stack is completed. The apparatus makes power used for a cold start and a CSD highly efficient.

20 Claims, 11 Drawing Sheets

(51) Int. Cl.
*H01M 8/04858* (2016.01)
*H01M 8/04955* (2016.01)
*H01M 10/44* (2006.01)
*H01M 16/00* (2006.01)

(52) U.S. Cl.
CPC ....... *H01M 8/04955* (2013.01); *H01M 10/44* (2013.01); *H01M 16/006* (2013.01)

(56) References Cited

U.S. PATENT DOCUMENTS

| | | |
|---|---|---|
| 10,291,054 B2 | 5/2019 | Watanabe et al. |
| 2017/0222291 A1 | 8/2017 | Elliott et al. |

FOREIGN PATENT DOCUMENTS

| | | | |
|---|---|---|---|
| KR | 2012060505 A | * | 6/2012 |
| KR | 10-2013-0084343 A | | 7/2013 |
| KR | 101666200 B1 | | 10/2016 |

* cited by examiner

APPARATUS FOR CONTROLLING FUEL CELL SYSTEM AND METHOD THEREOF

CROSS-REFERENCE TO RELATED APPLICATION

This application claims under 35 U.S.C. § 119(a) the benefit of priority to Korean Patent Application No. 10-2022-0041598, filed in the Korean Intellectual Property Office on Apr. 4, 2022, the entire contents of which are incorporated herein by reference.

1. FIELD

The present disclosure relates to an apparatus for controlling a fuel cell system and a method thereof, and more particularly, relates to an apparatus for controlling a cold start and a cold shutdown (CSD) of the fuel cell system and a method thereof.

2. BACKGROUND

In general, a fuel cell system includes a fuel cell stack in which a plurality of fuel cells used as a power source are laminated, a fuel supply system for supplying hydrogen or the like which is a fuel to the fuel cell stack, an air supply system for supplying oxygen which is an oxidizing agent necessary for electrochemical reaction, a water and heat management system for controlling a temperature of the fuel cell stack, and the like.

A fuel cell generation system which requires high power is implemented by connecting a plurality of fuel cell modules (systems) in parallel to increase the amount of power. An existing high power multi-module fuel cell generation system is made up by additionally mounting a boost converter for power control on an individual fuel cell module for power control of the fuel cell module. At this time, when the plurality of fuel cell modules are connected with each other in parallel, a unidirectional insulation-type converter is used as a converter for power control to ensure insulation resistance of the entire power generation system in a safe level. There is a need to drive an air compressor for a cold start and a cold shutdown (CSD) of a fuel cell. It is unable to use an energy source (e.g., a battery) at a converter output upon the cold start and the CSD due to the use of the unidirectional boost converter. Thus, an additional power supply device for starting should be connected and configured for each individual fuel cell module. Furthermore, as a buck converter for using power of a high voltage battery is also connected for the CSD, the configuration thereof is complicated. Thus, there is a need to develop a technology for addressing such problems.

SUMMARY

The present disclosure addresses the above-mentioned problems occurring in the related art while advantages achieved by the related art are maintained intact.

According to an aspect of the present disclosure, an apparatus for controlling a cold start and a cold shutdown (CSD) of a fuel cell system and a method thereof.

According to another aspect of the present disclosure, an apparatus for controlling a fuel cell system to reduce the number of low voltage batteries and the number of bi-directional low voltage DC-DC converters (BLDCs) used for a multi-module fuel cell generation system and reduce the complexity of control and a method thereof.

According to another aspect of the present disclosure, an apparatus for controlling a fuel cell system to improve temperature increase efficiency and make power used for a cold start efficient by first increasing a temperature of a stack with the highest accumulated usage of the fuel cell stack in a cold start situation and a method thereof.

According to another aspect of the present disclosure, an apparatus for controlling a fuel cell system to charging a high voltage battery upon a cold start or a CSD and a method thereof.

According to another aspect of the present disclosure, an apparatus for controlling a fuel cell system to address a problem in which the sum of power is able to be greater than required power upon minimum power control by driving a representative fuel cell stack in the module or some fuel cell stacks with high priorities if necessary and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a fuel cell system may include a monitoring device connected with one or more fuel cell stacks of a fuel cell module, the monitoring device being configured to individually monitor at least one of: an amount of accumulated power and/or an amount of accumulated driving time of each fuel cell stack the one or more fuel cell stacks. In various embodiments, a controller may be configured to (a) select a representative fuel cell stack among the one or more fuel cell stacks based on the amount of accumulated power and/or the accumulated driving time, (b) perform a cold start of the selected representative fuel cell stack, and (c) perform cold starts of at least one of the remaining fuel cell stacks of the one or more fuel cell stacks using power of the selected representative fuel cell stack after the cold start of the selected representative fuel cell stack is completed.

In an embodiment, one or more air compressors may be included. Each air compressor of the one or more air compressors being individually connected to each fuel cell stack among the one or more fuel cell stacks, the controller may be further configured to drive a corresponding air compressor of the one or more air compressors that is individually connected with a corresponding fuel cell stack of the one or more fuel cell stacks when performing the cold start of the corresponding fuel cell stack.

In an embodiment, one or more low voltage batteries and one or more bi-directional low voltage DC-DC converters (BLDC) may be provided. Each low voltage battery may be connected to a corresponding BLDC of the one or more BLDC, and each corresponding BLDC may be connected to a corresponding fuel cell stack of the one or more fuel cell stacks. Additionally, the controller may be further configured to select the representative fuel cell stack among the one or more fuel cell stacks connected to the corresponding low voltage battery through the corresponding BLDC and perform the cold start of the selected representative fuel cell stack using power of the corresponding low voltage battery.

In an embodiment, the controller may be configured to select a fuel cell stack of the one or more fuel cell stacks having the highest amount of accumulated power and/or the longest accumulated driving time as the representative fuel cell stack.

In an embodiment, the controller may be further configured to determine a prioritization ranking for performing cold starts of the one or more fuel cell stacks, the prioritization ranking being based on the amount of accumulated power and/or the accumulated driving time of each fuel cell stack of the one or more fuel cell stacks, and perform cold starts of the one or more fuel cell stacks according to the prioritization ranking.

In an embodiment, the controller may be configured to consume at least a portion of power generated by the fuel cell stack by activating an air compressor connected with a different fuel cell stack.

In an embodiment, the controller may be configured to consume the portion of the power generated by the fuel cell stack during the cold start, by bypassing driving of the corresponding air compressor connected with the different fuel cell stack.

In an embodiment, the controller may be configured to charge a high voltage battery connected with the one or more fuel cell stacks using at least a portion of power generated by the fuel cell stack during the cold start.

In an embodiment, the fuel cell module may be composed of a number of fuel cell stacks, the number being determined based on a value obtained by dividing power of one fuel cell stack by power necessary for driving of one air compressor.

In an embodiment, the controller may be configured to perform cold starts of the one or more fuel cell stacks based on power required for the fuel cell module from an upper-level controller.

In an embodiment, the controller may be configured to determine the number of fuel cell stacks being cold started, such that power generated by the fuel cell stack which is during the cold start is greater than or equal to a power requirement for the fuel cell module.

In an embodiment, the controller may be configured to control power the fuel cell stack after the cold start is completed based on a value obtained by subtracting power generated by the fuel cell stack which is during the cold start from the power required for the fuel cell module.

In an embodiment, the controller may be configured to determine priorities for cold shutdowns (CSDs) of the one or more fuel cell stacks based on at least one of the amount of accumulated power and/or the accumulated driving time of the one or more fuel cell stacks, and the controller may be configured to perform the CSDs of the one or more fuel cell stacks, based on the priorities for the CSDs.

According to another aspect of the present disclosure, a method for controlling a fuel cell system may include the steps of individually monitoring, by a monitoring device connected with one or more fuel cell stacks of a fuel cell module, at least one of an amount of: an amount of accumulated power and/or an amount of accumulated driving time of the one or more fuel cell stacks, selecting, by a controller, a representative fuel cell stack among the one or more fuel cell stacks based on the amount of accumulated power and/or the amount of accumulated driving time, performing, by the controller, a cold start of the selected representative fuel cell stack, and performing, by the controller, cold starts of at least one of the remaining fuel cell stacks of the one or more fuel cell stacks using power of the selected representative fuel cell stack after the cold start of the representative fuel cell stack is completed.

In an embodiment, the selecting of the representative fuel cell stack among the one or more fuel cell stacks by the controller may include selecting, by the controller, the representative fuel cell stack among fuel cell stacks connected with a low voltage battery through a BLDC. The performing of the cold start of the representative fuel cell stack by the controller may include performing, by the controller, the cold start of the representative fuel cell stack, using power of the low voltage battery.

In an embodiment, the selecting of the representative fuel cell stack among the fuel cell stacks connected with the low voltage battery through the BLDC by the controller may include selecting, by the controller, a fuel cell stack, having the highest amount of accumulated power and/or the longest accumulated driving time, among the fuel cell stacks connected with the low voltage battery through the BLDC as the representative fuel cell stack.

In an embodiment, the method may further include consuming, by the controller, at least a portion of power, generated by the fuel cell stack during the cold start via an air compressor connected with a different fuel cell stack.

In an embodiment, the consuming of the portion of the power generated by the fuel cell stack during the cold start further includes consuming, by the controller, the portion of the power generated by the fuel cell stack during the cold start by bypassing driving of the air compressor connected with the different fuel cell stack.

In an embodiment, the method may further include charging, by the controller, a high voltage battery connected with the one or more fuel cell stacks using at least a portion of power generated by the fuel cell stack during the cold start.

In an embodiment, the method may further include controlling, by the controller, cold starts of the one or more fuel cell stacks, based on power required for the fuel cell module from an upper-level controller.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
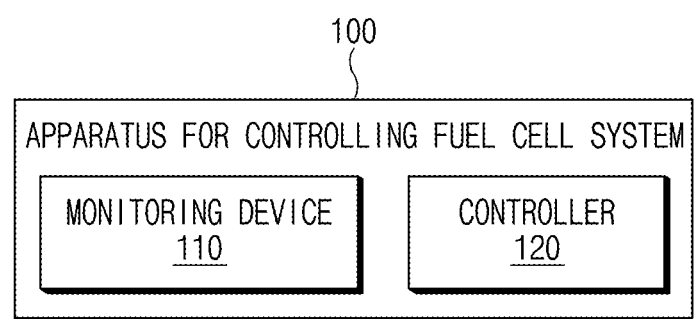
FIG. 1 is a block diagram illustrating an apparatus for controlling a fuel cell system according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

FIG. 1 is a block diagram illustrating an apparatus for controlling a fuel cell system according to an embodiment of the present disclosure.

An apparatus 100 for controlling a fuel cell system according to an embodiment of the present disclosure may be implemented inside or outside the fuel cell system. In this case, the apparatus 100 for controlling the fuel cell system may be integrally configured with control units in the fuel cell system or may be implemented as a separate hardware device to be connected with the control units of the fuel cell system by a separate connection means.

As an example, the apparatus 100 for controlling the fuel cell system may be integrally configured with the fuel cell system or may be implemented as a configuration independent of the fuel cell system in the form of being installed/attached to the fuel cell system. Alternatively, a part of the apparatus 100 for controlling the fuel cell system may be integrally configured with the fuel cell system or the other may be implemented as a configuration independent of the fuel cell system in the form of being installed/attached to the fuel cell system.

The apparatus 100 for controlling the fuel cell system may be provided in a fuel cell module including one or more fuel cell stacks or may be connected with the fuel cell module.

As an example, the fuel cell system may be provided in the vehicle to supply power to a motor and other auxiliary machinery of the vehicle. However, the fuel cell system may be implemented to supply power to another target needing power without being limited to the vehicle.

The one or more fuel cell stacks of the fuel cell module connected with the apparatus 100 for controlling the fuel cell system may be connected with each other in parallel to supply power a grid.

Referring to FIG. 1, the apparatus 100 for controlling the fuel cell system may include a monitoring device 110 and a controller 120.

The monitoring device 110 and the controller 120 may include a processor which performs data processing and/or calculation described below. Furthermore, the monitoring device 110 and the controller 120 may include a memory which stores data or an algorithm required in a process of performing data processing and/or calculation.

The processor which may be included in the monitoring device 110 and the controller 120 may be an electric circuit which executes a command of software. For example, the processor included in the monitoring device 110 and the controller 120 may be a fuel-cell control unit (FCU), an electronic control unit (ECU), a micro controller unit (MCU), or another sub-controller.

The memory which may be included in the monitoring device 110 and the controller 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The monitoring device 110 may be connected with the one or more fuel cell stacks making up the fuel cell module to separately monitor at least one of an amount of accumulated power and an accumulated driving time of the one or more fuel cell stacks.

As an example, the monitoring device 110 may include a non-volatile memory (NVM) which stores information about at least one of an amount of accumulated power or an accumulated driving time of an individual fuel cell stack.

As an example, when the driving of the fuel cell stack is ended, the monitoring device 110 may update information about the at least one of the amount of accumulated power or the accumulated driving time of the individual fuel cell stack, which is stored in the NVM.

In this process, when the driving of the fuel cell stack is ended, the monitoring device 110 may add an amount of power or a driving time of the individual fuel cell stack, which is in recent driving, to the amount of accumulated power or the accumulated driving time of the individual fuel cell stack, which is accumulated up to the previous driving process to update the information about the at least one of the amount of accumulated power or the accumulated driving time of the individual fuel cell stack, which is stored in the NVM.

As an example, the monitoring device 110 may individually monitor a time when one or more fuel cell stacks are continuously driven or an amount of power continuously output by the one more fuel cell stacks in real time.

As an example, the monitoring device 110 may individually monitor a time when the individual fuel cell stack is continuously driven in the current driving process of the individual fuel cell stack or an amount of power continuously output by the individual fuel cell stack in the current driving process of the individual fuel cell stack, without considering the accumulated driving time of the individual fuel cell stack, which is accumulated up to the previous driving process.

As an example, the monitoring device 110 may determine at least one of an amount of accumulated power or an accumulated driving time of the individual fuel cell stack in real time, by means of the information about the at least one of the amount of accumulated power or the accumulated driving time of the individual fuel cell stack, which is stored in the NVM and is accumulated up to the previous driving process, and the at least one of the amount of power or the driving time of the individual fuel cell stack, which is measured in real time.

As an example, the monitoring device 110 may be connected with the controller 120 through wireless or wired communication to deliver information about at least one of an amount of accumulated power or an accumulated driving time of one or more fuel cell stacks to the controller 120 in real time.

The controller 120 may select a representative fuel cell stack among the one or more fuel cell stacks, based on the monitored at least one of the amount of accumulated power or the accumulated driving time.

As the amount of accumulated power or the accumulated driving time of the individual fuel cell stack is larger, the individual fuel cell stack may be a fuel cell stack, durability of which is greatly reduced or deteriorated.

The fuel cell stack, the durability of which is reduced or deteriorated, may be a fuel cell stack close to an end of life (EOL).

The closer the fuel cell stack is to the EOL, the lower the output efficiency and the larger the calorific value. Thus, the closer the fuel cell stack is to the EOL, the more advantageous it is to increase the temperature during the cold start.

However, the monitoring device 110 may fail to accumulate the amount of power or the driving time upon a cold start or a cold shutdown, in the process of monitoring the amount of accumulated power or the accumulated driving time of the fuel cell stack.

Furthermore, the monitoring device 110 may fail to accumulate an extremely low-power operation time or an amount of extremely low-power, in the process of monitoring the amount of accumulated power or the accumulated driving time of the fuel cell stack.

Thus, the controller 120 may select a fuel cell stack favorable to an increase in temperature as the representative fuel cell stack, thus efficiently perform a cold start of the fuel cell stack.

As an example, the controller 120 may select a representative fuel cell stack among fuel cell stacks connected with a low voltage battery through a bi-directional low voltage DC-DC converter (BLDC).

Because the representative fuel cell stack first proceeds with the cold start among fuel cell stacks included in the fuel cell module, it may not receive power from another fuel cell stack.

Thus, the representative fuel cell stack may receive power through the low voltage battery connected through the BLDC to drive an air compressor, thus performing the cold start.

In other words, because the representative fuel cell stack should necessarily be a fuel cell stack connected with the low voltage battery, the controller 120 may select the representative fuel cell stack among fuel cell stacks connected with the low voltage battery through the BLDC.

As an example, the controller 120 may select a fuel cell stack, having the highest amount of accumulated power or the longest accumulated driving time, among fuel cell stacks connected with the low voltage battery through the BLDC as the representative fuel cell stack.

When only one of the fuel cell stacks included in the fuel cell module is connected with the low voltage battery through the BLDC, the controller 120 may select the fuel cell stack connected with the low voltage battery through the BLDC as the representative fuel cell stack without regard to the amount of accumulated power or the accumulated driving time.

When only two or more of the fuel cell stacks included in the fuel cell module are connected with the low voltage battery through the BLDC, the controller 120 may select a fuel cell stack, having the highest amount of accumulated power or the longest accumulated driving time, among the two or more fuel cell stacks connected with the low voltage battery through the BLDC as the representative fuel cell stack.

The controller 120 may perform a cold start of the representative fuel cell stack and may perform cold starts of the other fuel cell stacks, using power of the representative fuel cell stack, the cold start of which is completed.

As an example, the controller 120 may drive the air compressor connected with the representative fuel cell stack, using the power of the low voltage battery, to perform the cold start of the representative fuel cell stack.

As an example, the controller 120 may drive the air compressors individually connected with the other fuel cell stacks, using the power of the representative fuel cell stack, the cold start of which is completed, to perform the cold starts of the other fuel cell stacks.

As an example, the fuel cell module may be composed of a number of fuel cell stacks determined based on a value obtained by dividing power of one fuel cell stack by power necessary for driving of one air compressor.

As a number of fuel cell stacks which are less than or equal to the value obtained by dividing the power of the one fuel cell stack by the power necessary for the driving of one air compressor make up one fuel cell module, the apparatus 100 for controlling the fuel cell system may simultaneously drive air compressors connected with the other fuel cell stacks using the power generated from the one fuel cell stack.

As an example, when the power of one fuel cell stack is 50 kW and when the power necessary for the driving of the air compressor is 10 kW, as five (=50 kW/10 kW) fuel cell stacks make up one module, the apparatus 100 for controlling the fuel cell system may simultaneously drive the air compressors connected with the other fuel cell stacks using the power generated from the one fuel cell stack.

As an example, the controller 120 may determine a prioritization ranking for cold starts of one or more fuel cell stacks, based on the at least one of the amount of accumulated power or the accumulated driving time of the one or more fuel cell stacks, and may control the cold starts of the one or more fuel cell stacks, based on the prioritization ranking for the cold starts. For example, the cold starts may be performed sequentially from a highest priority ranking through intermediate priority rankings and finish with a lowest priority ranking.

Because there may be a need to only start some of one or more fuel cell stacks, the controller 120 may control cold starts of the one or more fuel cell stacks in an order where the priorities for the cold starts are high, thus enhancing the efficiency of the cold starts of the one or more fuel cell stacks.

Because the higher the amount of accumulated power or the accumulated driving time of the fuel cell stack, the more the heating efficiency of the fuel cell stack increases, the fuel cell stack may be a fuel cell stack having high efficiency of the cold start. Thus, the higher the amount of accumulated power or the accumulated driving time of the fuel cell stack, the higher the controller 120 may assign a priority for the cold start of the fuel cell stack to be.

As an example, the controller 120 may consume at least a portion of power, generated by means of the fuel cell stack which is during the cold start, by means of an air compressor connected with a fuel cell stack which is not during the cold start.

In the cold start process of the fuel cell stack, power output from the fuel cell stack which is during the cold start should be consumed.

As an example, the controller 120 may consume the at least a portion of the power, generated by means of the fuel cell stack which is during the cold start, by means of bypass driving of the air compressor connected with the fuel cell stack which is not during the cold start.

The bypass driving of the air compressor will be described in detail below with reference to FIG. 5.

As an example, the controller 120 may charge a high voltage battery connected with one or more fuel cell stacks, using the at least a portion of the power generated by means of the fuel cell stack which is during the cold start.

When the high voltage battery is connected with the one or more fuel cell stacks, the controller 120 may charge the high voltage battery by means of power output from the fuel cell stack which is during the cold start, which should be consumed.

However, prior to charging the high voltage battery, the controller 120 may determine whether a current state of charge (SOC) of the high voltage battery is lower than a target SOC of the high voltage battery and may charge the high voltage battery only when the current SOC is lower than the target SOC.

As an example, the controller 120 may perform cold starts of one or more fuel cell stacks, based on power required for the fuel cell module from an upper-level controller.

As an example, the controller 120 may receive information about the power required for the fuel cell generation system from the upper-level controller.

As an example, the controller 120 may determine the number of fuel cell stacks which are cold started, such that the power generated by means of the fuel cell stack which is during the cold start is greater than or equal to the power required for the fuel cell module.

Thus, the controller 120 may meet power required from the upper-level controller by means of the power generated by means of the fuel cell stack which is during the cold start.

At this time, the controller 120 may consume power, remaining after meeting the power required from the upper-level controller in the power generated by means of the fuel cell stack which is during the cold start, by means of bypass driving of the air compressor connected with another fuel cell stack which is not during the cold start.

In this case, the consumed power may be calculated with reference to Equation 1 below.

$$P_{Etc} = P_{All} - (P_{Cld} * N_{Pmc})$$ [Equation 1]

$$P_{One} = P_{Etc}/(N - N_{Pmc})$$

Herein, $P_{Etc}$ may refer to the total power which should be consumed by means of the air compressor connected with the other fuel cell stack which is not during the cold start, $P_{all}$ may refer to the power required from the upper-level controller, $P_{Cld}$ may refer to the power generated from one fuel cell stack upon the cold start, $N_{Pmc}$ may refer to the number of fuel cell stacks which are during the cold start, $P_{one}$ may refer to the power which should be consumed by means of the air compressor connected with the other fuel cell stack which is not during the cold start, and N may refer to the total number of fuel cell stacks in the fuel cell module.

As an example, the controller 120 may determine the number of a minimum number of fuel cell stacks which are cold started, in which the power generated by the fuel cell stack which is during the cold start is greater than or equal to the power required for the fuel cell module, and may perform cold starts of the determined number of fuel cell stacks.

As an example, the controller 120 may control power of the fuel cell stack, the cold start of which is already completed, based on a value obtained by subtracting the power generated by means of the fuel cell stack which is during the cold start from the power required for the fuel cell module.

As an example, the controller 120 may control individual power of the fuel cell stack, the cold start of which is already completed, using a value obtained by dividing the value, obtained by subtracting the power generated by means of the fuel cell stack which is during the cold start from the power required for the fuel cell module, by the number of the fuel cell stacks, the cold start of which is already completed.

As an example, the controller 120 may determine priorities for cold shutdowns (CSDs) of one or more fuel cell stacks, based on the at least one of the amount of accumulated power or the accumulated driving time of the one or more fuel cell stacks, and may control the CSDs of the one or more fuel cell stacks, based on the priorities for the CSDs.

As an example, the controller 120 may drive an air compressor connected with a fuel cell stack which is cold shut down to perform the CSD, by means of power of the representative fuel cell stack or another fuel cell stack which is being driven.

As an example, the controller 120 may set the priorities for the CSDs to be opposite to the priorities for the cold starts.

In other words, the lower the amount of accumulated power or the accumulated driving time of the fuel cell stack, the higher the priority for the CSD of the fuel cell stack may be.

The lower the amount of accumulated power or the accumulated driving time, the higher the efficiency of the air compressor connected with the fuel cell stack may be.

Thus, the controller 120 may first cold shut down a fuel cell stack with the low amount of accumulated power or the short accumulated driving time, thus improving the efficiency of the CSD.

Figure 2:
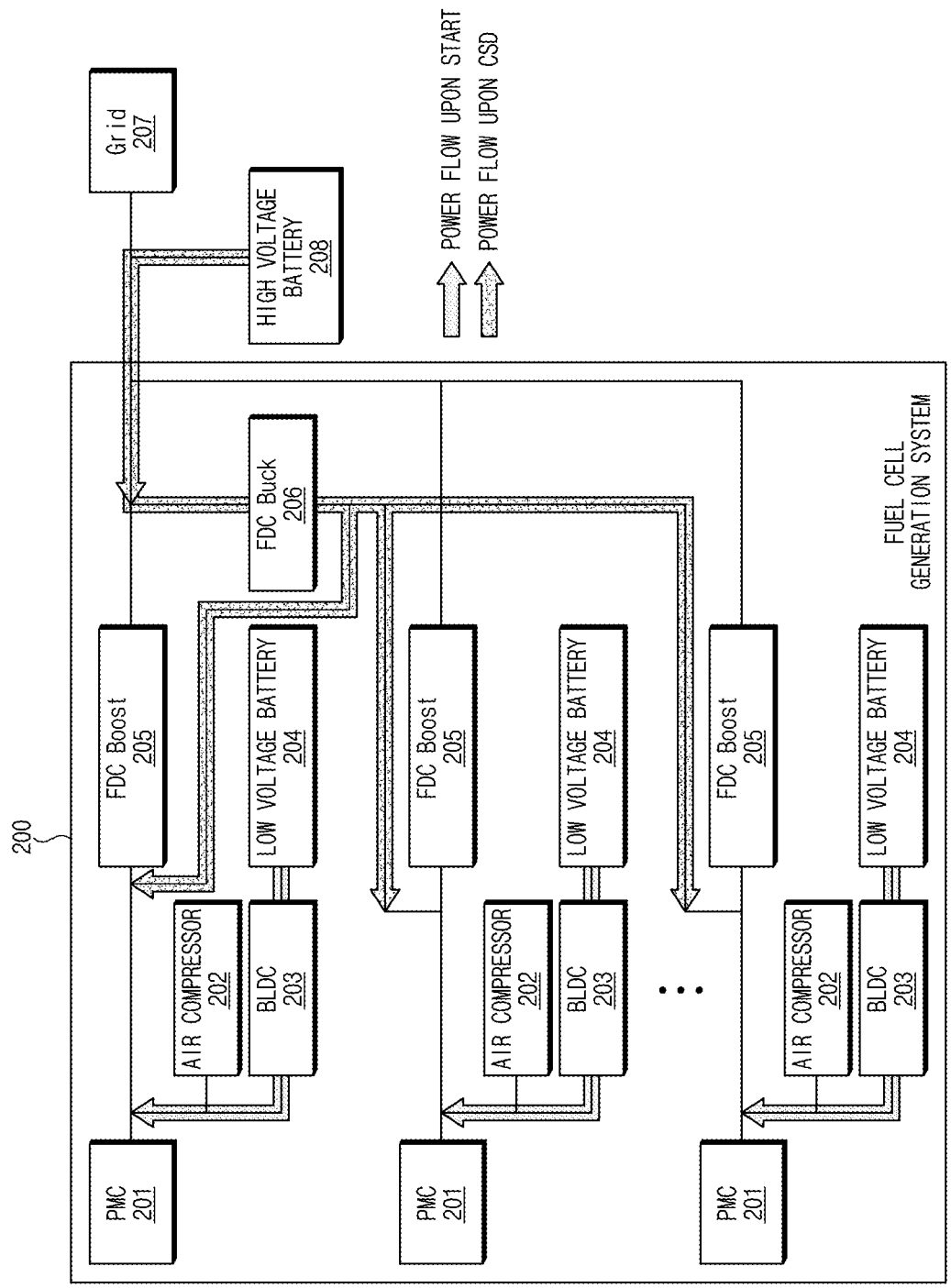
FIG. 2 is a drawing illustrating a detailed configuration of an existing fuel cell generation system.

FIG. 2 is a drawing illustrating a detailed configuration of an existing fuel cell generation system.

Referring to FIG. 2, an existing fuel cell generation system 200 may include a plurality of power module completes (PMCs) 201.

To implement required high power, the plurality of PMCs 201 may be connected with each other in parallel to supply power to a grid 207.

Boost converters, FDC boosts, or fuel-cell DC-DC converter boosts 205 respectively connected with the plurality of PMCs 201 may control power generated by means of the plurality of PMCs 201 to be boosted and may deliver the boosted power to a grid 207.

The FDC boost 205 may be implemented as a unidirectional insulation-type converter, such that insulation resistance is maintained in a safe level.

The plurality of PMCs 201 may perform a cold start or a CSD of each fuel cell stack by means of the driving of air compressors 202.

Each of the existing PMCs 201 may be connected with a low voltage battery 204 through a bi-directional low voltage DC-DC converter (BLDC) 203.

Power generated by means of the low voltage battery 204 when the existing PMC 201 is cold started may be controlled by means of the BLDC 203 to be delivered to the air compressor 202.

When the existing PMC 201 is cold started, the air compressor 202 may be driven by power of the low voltage battery 204.

A high voltage battery 208 may be connected with the outside of the existing fuel cell generation system 200.

Power generated by means of the high voltage battery 208 may be controlled to be bucked by means of a buck converter, FDC buck, or fuel-cell DC-DC converter buck 206 to be delivered to the air compressor 202.

When the existing PMC 201 is cold shut down, the air compressor 202 may be driven by power of the high voltage battery 208.

The configuration is complicated and the complexity of control is high for the cold start and the CSD of the PMC 201 in the existing fuel cell generation system 200.

Figure 3:
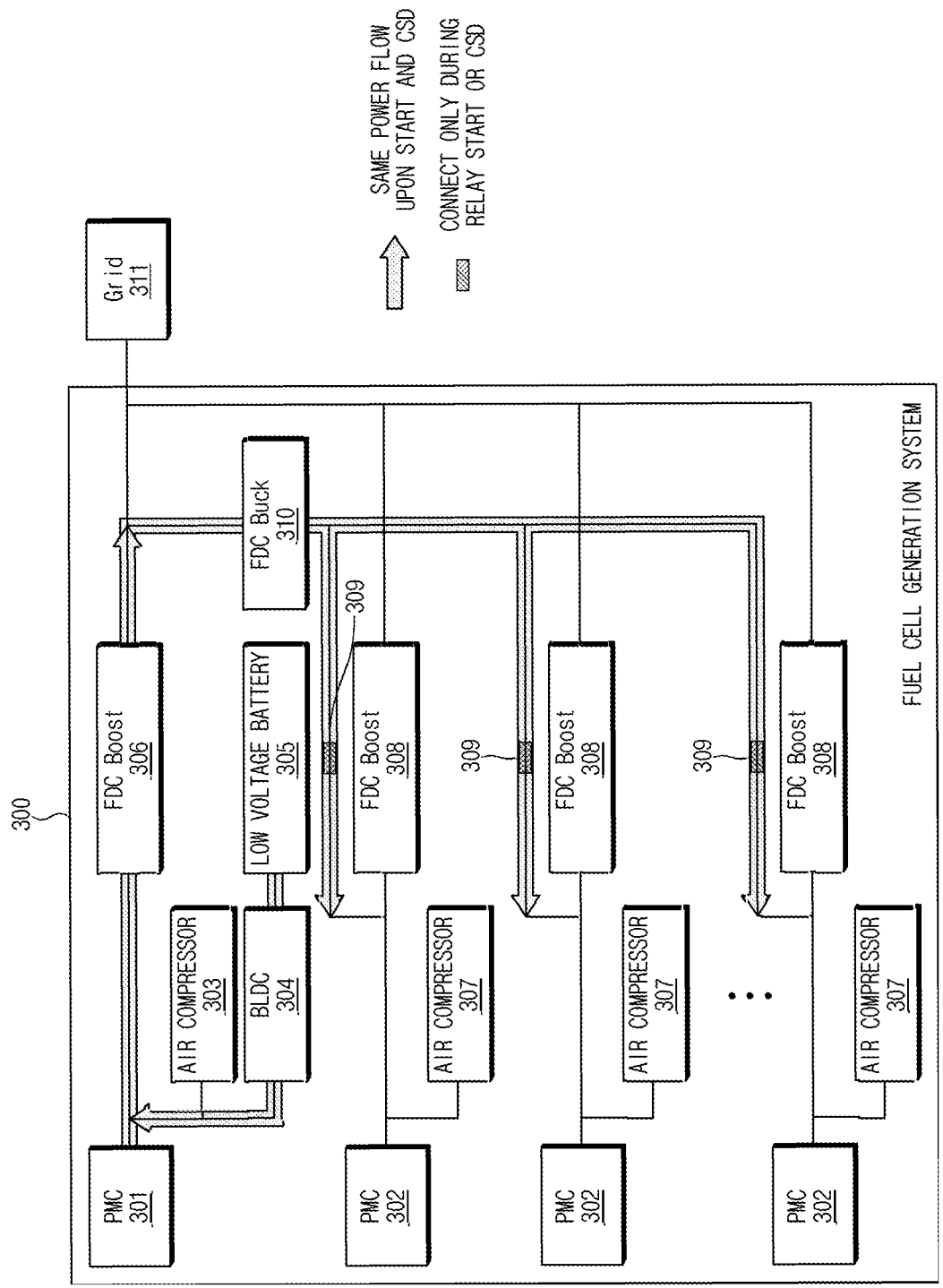
FIG. 3 is a drawing illustrating a detailed configuration of a fuel cell generation system according to an embodiment of the present disclosure.

FIG. 3 is a drawing illustrating a detailed configuration of a fuel cell generation system according to an embodiment of the present disclosure.

Referring to FIG. 3, a fuel cell generation system 300 may include a representative PMC 301 and the other PMCs 302.

To implement required high power, the representative PMC 301 and the other PMCs 302 may be connected with each other in parallel to supply power to a grid 311.

An FDC boost 306 and FDC boosts 308 respectively connected with the representative PMC 301 and the other PMCs 302 may control power generated by means of the representative PMC 301 and the other PMCs 302 to be boosted to be delivered to the grid 311.

Each of the FDC boosts 306 and 308 may be implemented as a unidirectional insulation-type converter, such that insulation resistance is maintained in a safe level.

The representative PMC 301 and the other PMCs 302 may perform a cold start or a CSD of each fuel cell stack by means of the driving of an air compressor 303 and air compressors 307 respectively connected thereto.

The representative PMC 301 may be connected with a low voltage battery 305 through a BLDC 304.

Power generated by means of the low voltage battery 305 when the representative PMC 301 is cold started or cold shut down may be controlled by means of the BLDC 305 to be delivered to the air compressor 303.

When the representative PMC 301 is cold started or is cold shut down, the air compressor 303 connected with the representative PMC 301 may be driven by power of the low voltage battery 305.

A low voltage battery and a BLDC may fail to be connected with the other PMCs 302.

Power generated by means of the representative PMC 301 when the other PMCs 302 are cold started or are cold shut down may be delivered to the air compressors 307 connected with the other PMCs 302, through the FDC boost 306 and the FDC buck 310.

When the other PMCs 302 are cold started or are cold shut down, the air compressors 307 connected with the other PMCs 302 may be driven by power of the representative PMC 301.

As relays 309 connected with the other PMCs 302 are controlled to be turned on when the other PMCs 302 are cold started or are cold shut down, power of the representative PMC 301 may be delivered to the air compressors 307.

The fuel cell generation system 300 according to an embodiment of the present disclosure does not need to be connected with an external high voltage battery to cold start or cold shut down the fuel cell stack.

Thus, the structure of the fuel cell generation system 300 may be simplified and the complexity of control may also be reduced.

Figure 4:
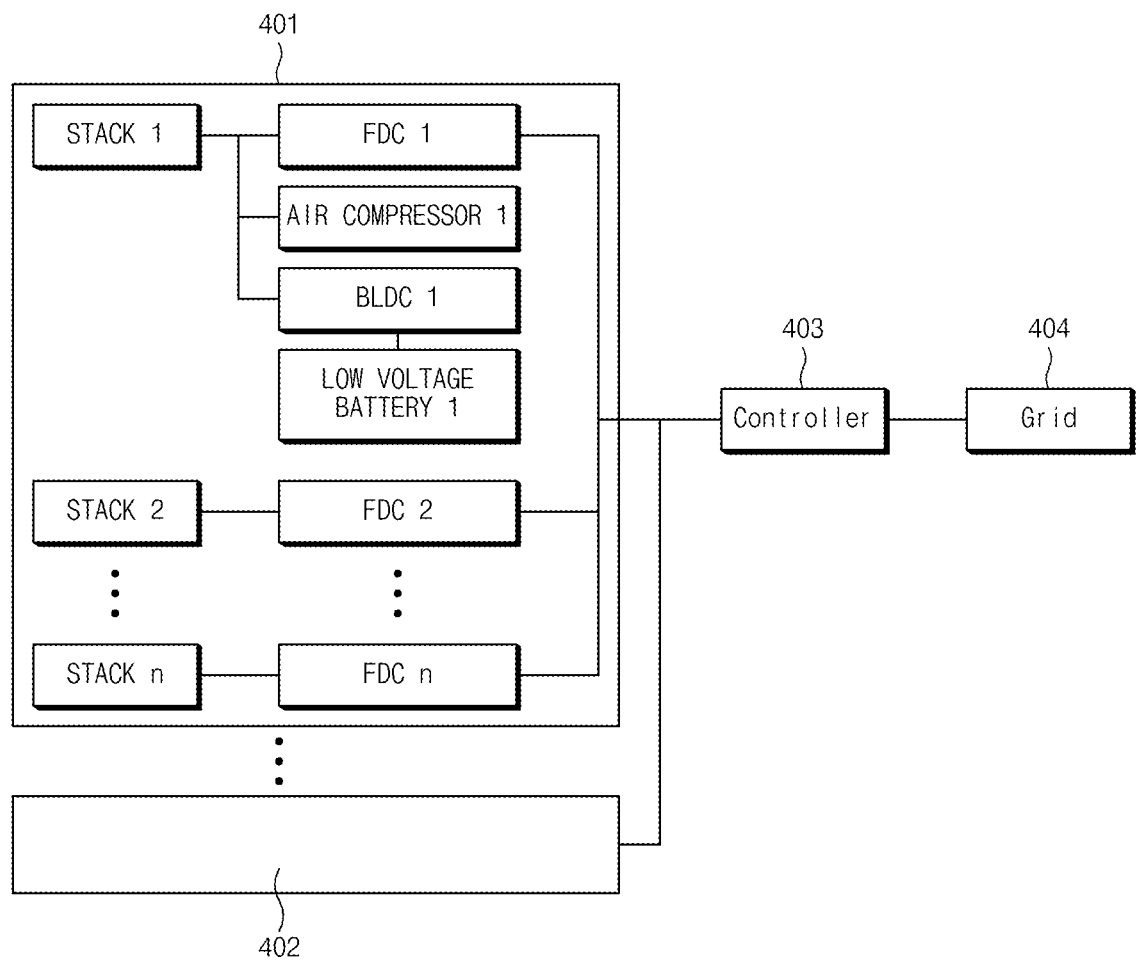
FIG. 4 is a drawing illustrating a multi-module fuel cell generation system according to an embodiment of the present disclosure.

FIG. 4 is a drawing illustrating a multi-module fuel cell generation system according to an embodiment of the present disclosure.

Referring to FIG. 4, the multi-module fuel cell generation system may include one or more fuel cell modules 401 and 402.

Herein, each of the fuel cell modules 401 and 402 may be understood as a component corresponding to a fuel cell generation system 300 of FIG. 3.

A controller 403 may diagnose and monitor states of the plurality of fuel cell modules 401 and 402.

As an example, the controller 403 may distribute and determine power required for the plurality of fuel cell modules 401 and 402, based on power required from a grid 404.

Furthermore, the controller 403 may control cold starts and CSDs of the plurality of fuel cell modules 401 and 402.

The controller 403 may monitor and manage at least one of an amount of accumulated power or an accumulated driving time of fuel cell stacks included in each of the fuel cell modules 401 and 402.

The controller 403 may determine a cold start order or a CSD order between the fuel cell modules 401 and 402, based on at least one of an amount of accumulated power or an accumulated driving time of a representative fuel cell stack of each of the fuel cell modules 401 and 402, and may control a cold start or a CSD of each of the fuel cell modules 401 and 402 in the determined order.

Figure 5:
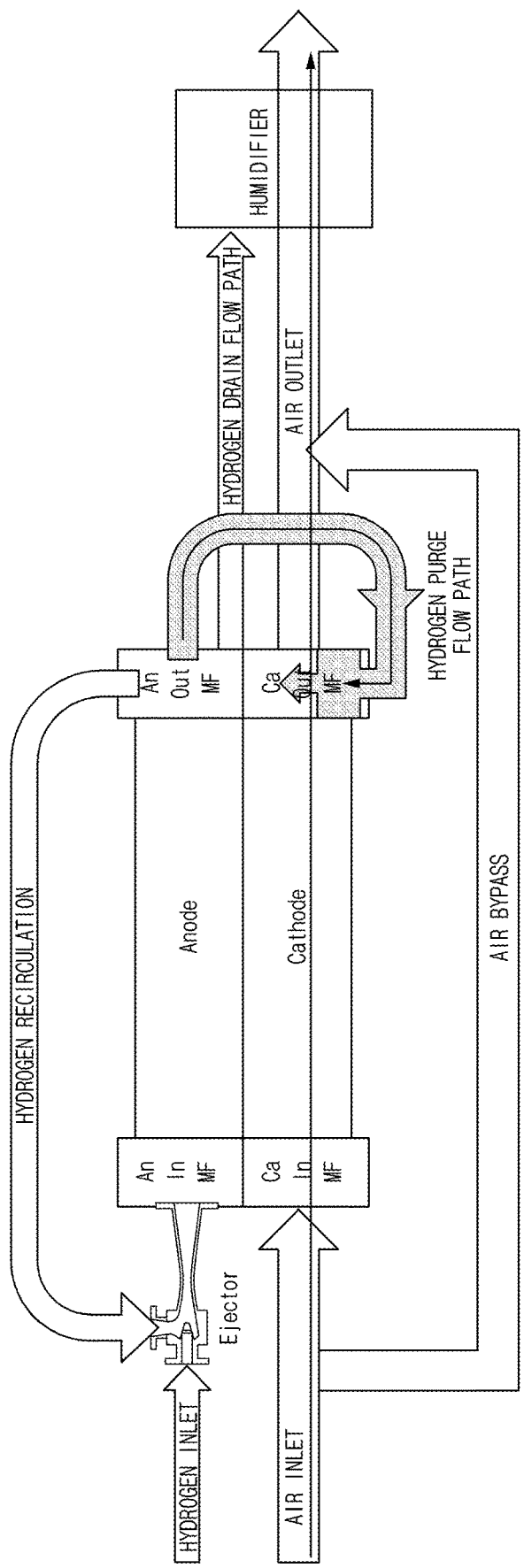
FIG. 5 is a drawing illustrating that an apparatus for controlling a fuel cell system consumes power by means of bypass driving of an air compressor according to an embodiment of the present disclosure.

FIG. 5 is a drawing illustrating that an apparatus for controlling a fuel cell system consumes power by means of bypass driving of an air compressor according to an embodiment of the present disclosure.

Referring to FIG. 5, the apparatus for controlling the fuel cell system may consume power generated when a fuel cell stack is cold started or is cold shut down by means of bypass driving of an air compressor connected with another fuel cell stack which is not during the cold start or the CSD.

Herein, the bypass driving of the air compressor may refer to driving for immediately supplying air generated as the air compressor is driven to an air outlet or a humidification module of the fuel cell stack through a bypass path, without supplying the generated air to the fuel cell stack.

In this case, hydrogen supplied to the anode may be supplied to the air outlet or the humidification module through a hydrogen purge flow path.

The apparatus for controlling the fuel cell system may consume power generated from the fuel cell stack which is during the cold start or the CSD, by means of driving of the air compressor connected with another fuel cell stack which is not during the cold start or the CSD.

Furthermore, the apparatus for controlling the fuel cell system may process air generated by the driving of the air compressor connected with the other fuel cell stack which is not during the cold start or the CSD through the bypass path.

FIGS. 6A to 6D are flowcharts illustrating an operation of an apparatus for controlling a fuel cell system according to an embodiment of the present disclosure.

Figure 6A:
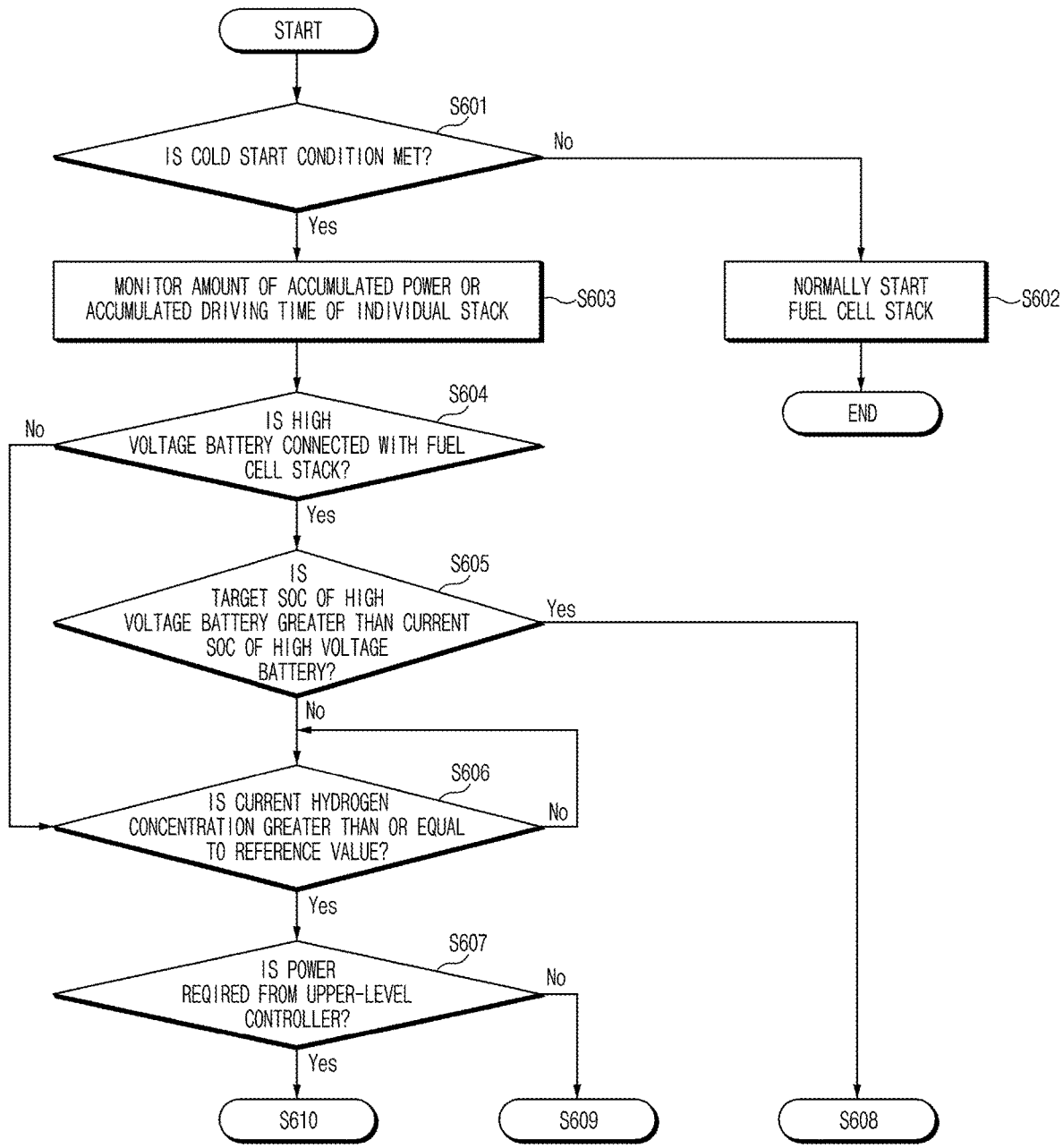
FIGS. 6A, 6B, 6C, and 6D are flowcharts illustrating an operation of an apparatus for controlling a fuel cell system according to an embodiment of the present disclosure.

Referring to FIG. 6A, in S601, the apparatus for controlling the fuel cell system may identify whether a cold start condition is met.

As an example, the apparatus for controlling the fuel cell system may identify whether a CSD condition is met, based on the result of comparing an outdoor air temperature with a predetermined reference temperature.

When the cold start condition is not met, in S602, the apparatus for controlling the fuel cell system may normally start a fuel cell stack.

When the cold start condition is met, in S603, the apparatus for controlling the fuel cell system may monitor an amount of accumulated power or an accumulated driving time of an individual fuel cell stack.

In S604, the apparatus for controlling the fuel cell system may identify whether a high voltage battery is connected with the fuel cell stack.

When it is determined that the high voltage battery is connected with the fuel cell stack, in S605, the apparatus for controlling the fuel cell system may identify whether a target SOC of the high voltage battery is greater than a current SOC of the high voltage battery.

As an example, the apparatus for controlling the fuel cell system may obtain information about the current SOC of the high voltage battery from a battery sensor connected with the high voltage battery and may compare the target SOC with the current SOC of the high voltage battery.

When the target SOC of the high voltage battery is greater than the current SOC of the high voltage battery, the apparatus for controlling the fuel cell system may perform S608.

When the target SOC of the high voltage battery is not greater than the current SOC of the high voltage battery, in S606, the apparatus for controlling the fuel cell system may identify whether current hydrogen concentration is greater than or equal to a reference value.

When it is determined that the high voltage battery is not connected with the fuel cell stack, in S606, the apparatus for controlling the fuel cell system may identify whether the current hydrogen concentration is greater than or equal to the reference value.

When the current hydrogen concentration is not greater than or equal to the reference value, the apparatus for controlling the fuel cell system may return to S606 to identify whether the current hydrogen concentration is greater than or equal to the reference value.

When the current hydrogen concentration is greater than or equal to the reference value, in S607, the apparatus for controlling the fuel cell system may identify whether power is required from an upper-level controller.

When the power is not required from the upper-level controller, the apparatus for controlling the fuel cell system may perform S609.

When the power is required from the upper-level controller, the apparatus for controlling the fuel cell system may perform S610.

Figure 6B:
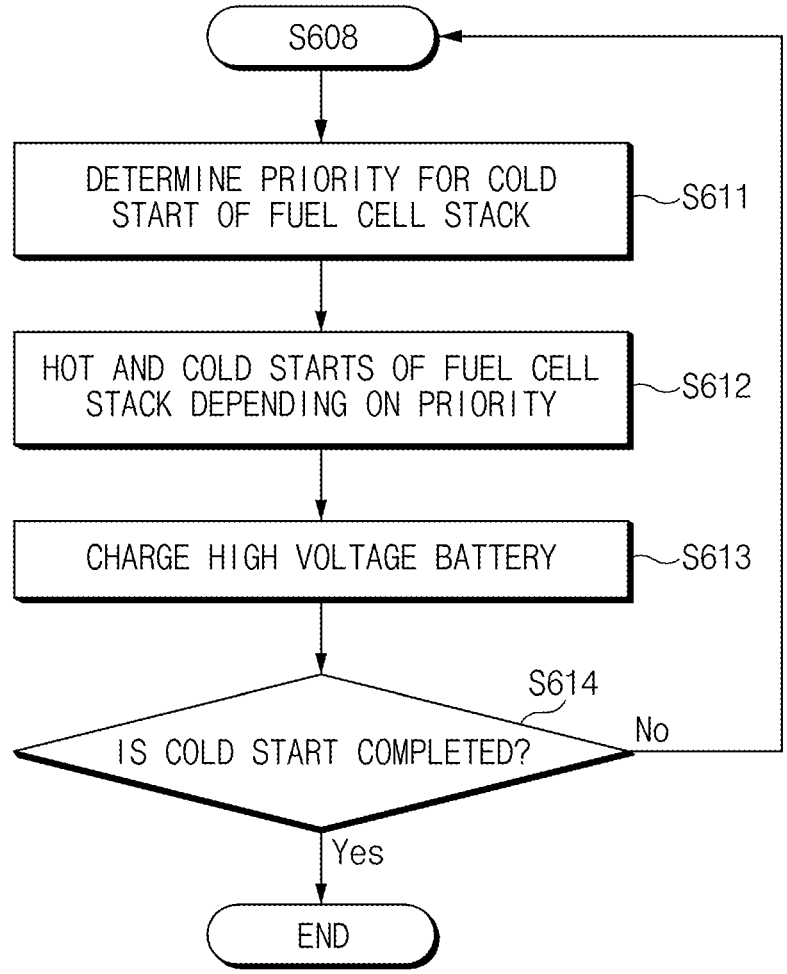

Referring to FIG. 6B, in S611, the apparatus for controlling the fuel cell system may determine a priority for a cold start of the fuel cell stack As an example, the apparatus for controlling the fuel cell system may determine the priority for the cold start of the fuel cell stack depending on the amount of accumulated power or the accumulated driving time.

In S612, the apparatus for controlling the fuel cell system may perform hot and cold starts of the fuel cell stack depending on the priority.

In S613, the apparatus for controlling the fuel cell system may charge the high voltage battery.

As an example, the apparatus for controlling the fuel cell system may hot and cold start fuel cell stacks one by one in an order where priorities are high and may charge the high voltage battery up to the target SOC by means of power generated during the cold start.

In S614, the apparatus for controlling the fuel cell system may identify whether the cold start is completed.

As an example, the apparatus for controlling the fuel cell system may identify whether the cold start is completed, based on the result of comparing a stack coolant outlet temperature with a reference value.

When the cold start is not completed, the apparatus for controlling the fuel cell system may return to S608.

Although not illustrated, as an example, the apparatus for controlling the fuel cell system may also set priorities for CSDs in an CSD process and may cold shut down fuel cell stacks one by one in the set priorities.

Furthermore, the apparatus for controlling the fuel cell system may charge the high voltage battery up to the target SOC by means of power generated while the fuel cell stack is cold shut down.

Figure 6C:
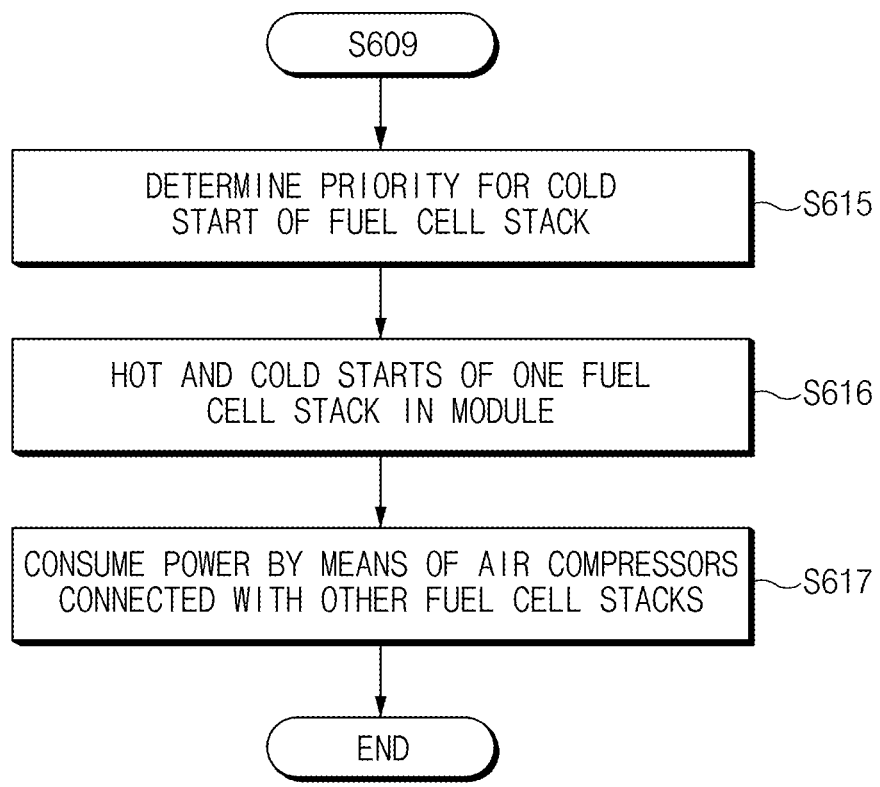

Referring to FIG. 6C, in S615, the apparatus for controlling the fuel cell system may determine a priority for a cold start of the fuel cell stack.

In S616, the apparatus for controlling the fuel cell system may perform hot and cold starts of one fuel cell stack in the fuel cell module.

When the power is not required from the upper-level controller, the apparatus for controlling the fuel cell system may not need to start a plurality of fuel cell stacks in the fuel cell module. Thus, when the power is not required from the upper-level controller, the apparatus for controlling the fuel cell system may hot and cold start only one fuel cell stack in the fuel cell module.

In S617, the apparatus for controlling the fuel cell system may consume power, generated in the process of hot and cold starting the one fuel cell stack in the fuel cell module, by means of air compressors connected with the other fuel cell stacks.

As an example, the apparatus for controlling the fuel cell system may consume power, generated in the process of hot and cold starting the fuel cell stack, by means of bypass driving of the air compressors connected with the other fuel cell stacks.

Figure 6D:
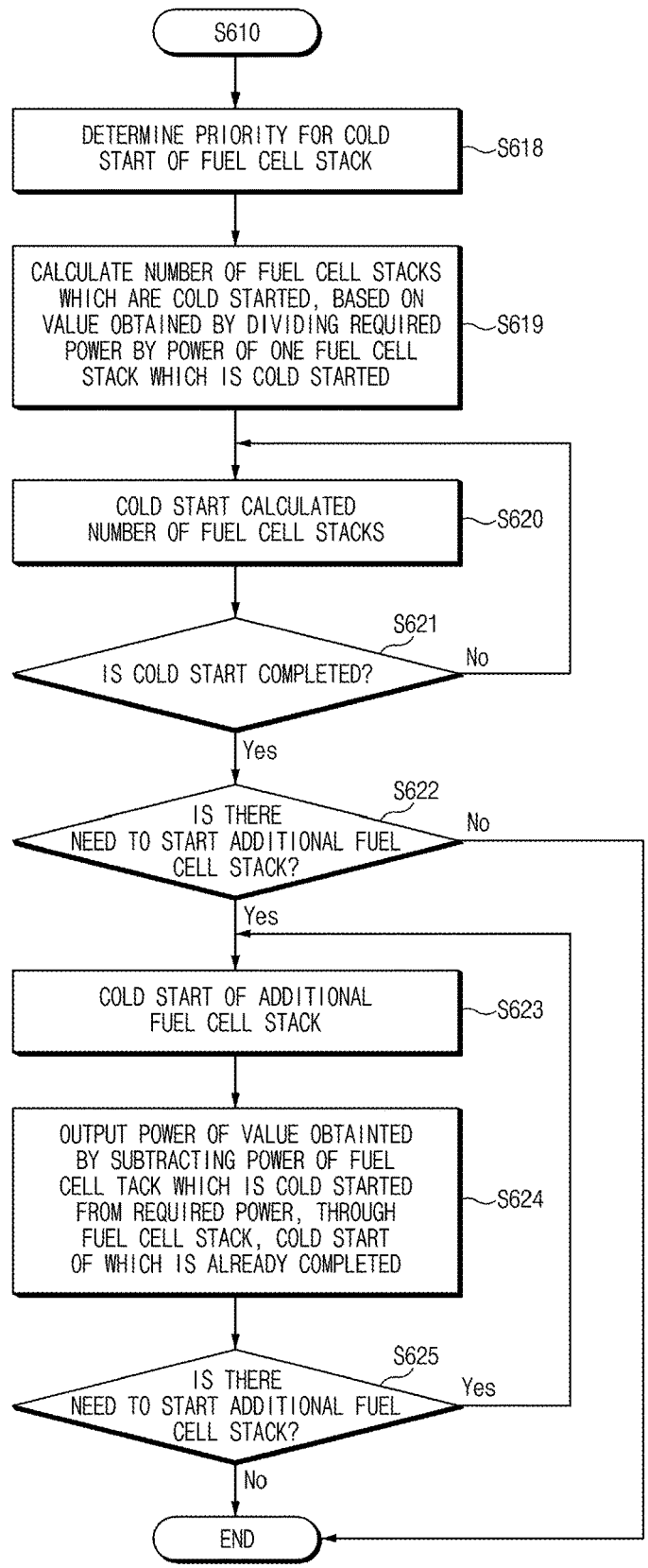

Referring to FIG. 6D, in S618, the apparatus for controlling the fuel cell system may determine a priority for cold start of a fuel cell stack.

In S619, the apparatus for controlling the fuel cell system may calculate the number of fuel cell stacks which are cold started, based on a value obtained by dividing the required power by the power generated in the cold start process of one fuel cell stack.

As an example, the apparatus for controlling the fuel cell system may determine the number of fuel cell stacks, which are cold started, as a number which is greater than or equal to the value obtained by dividing the required power by the power generated in the cold start process of one fuel cell stack.

In S620, the apparatus for controlling the fuel cell system may perform cold starts of the calculated number of fuel cell stacks.

As an example, the apparatus for controlling the fuel cell system may meet power required from the upper-level controller by means of power generated as the fuel cell stack is cold started.

As an example, the apparatus for controlling the fuel cell system may consume power, remaining after meeting the power required in the power generated as the fuel cell stack is cold started, by means of bypass driving of the air compressor connected with another stack which is not during the cold start.

In S621, the apparatus for controlling the fuel cell system may identify whether the cold start is completed.

When the cold start is not completed, the apparatus for controlling the fuel cell system may return to S620 to perform the cold starts of the calculated number of fuel cell stacks.

When the cold start is completed, in S622, the apparatus for controlling the fuel cell system may identify whether there is a need to start an additional fuel cell stack.

As an example, as power required from the upper-level controller increases, the apparatus for controlling the fuel cell system may identify whether there is a need to start the additional fuel cell stack.

When there is the need to start the additional fuel cell stack, in S623, the apparatus for controlling the fuel cell system may perform a cold start of the additional fuel cell stack.

In S624, the apparatus for controlling the fuel cell system may output power of a value obtained by subtracting power of the fuel cell stack which is cold started from the required power through the fuel cell stack, the cold start of which is already completed.

In this process, the apparatus for controlling the fuel cell system may add power generated while the fuel cell stack is cold started and power by means of the fuel cell stack, the cold start of which is already completed, and may control power of the fuel cell stack, the cold start of which is already completed, to meet the required power.

In S625, the apparatus for controlling the fuel cell system may identify whether there is a need to start an additional fuel cell stack.

When there is the need to start the additional fuel cell stack, the apparatus for controlling the fuel cell system may return to S623 to perform the cold start of the additional fuel cell stack.

Figure 7:
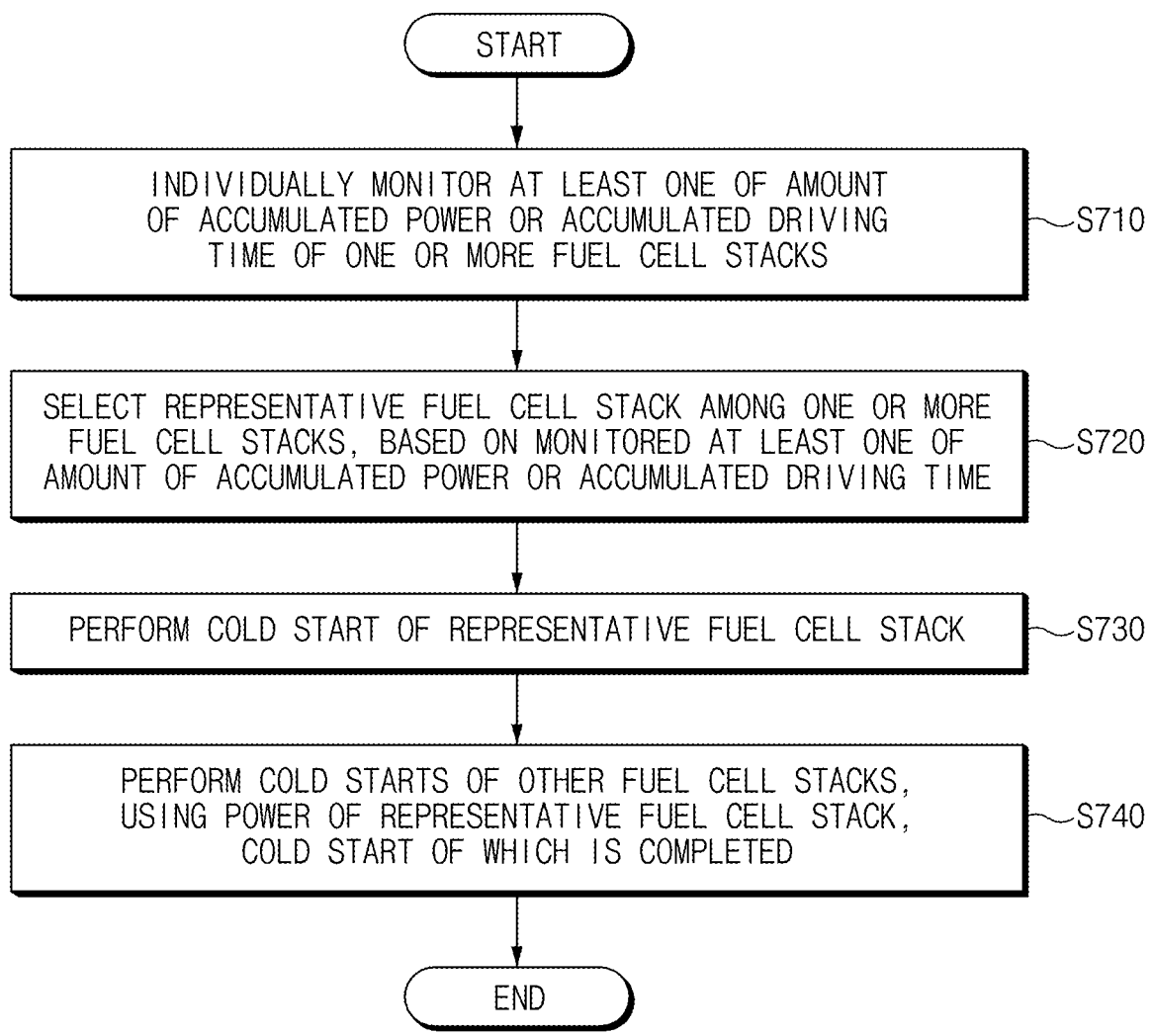
FIG. 7 is a flowchart illustrating a method for controlling a fuel cell system according to an embodiment of the present disclosure.

FIG. 7 is a flowchart illustrating a method for controlling a fuel cell system according to an embodiment of the present disclosure.

Referring to FIG. 7, the method for controlling the fuel cell system may include individually monitoring (S710) at least one of an amount of accumulated power or an accumulated driving time of one or more fuel cell stacks, selecting (S720) a representative fuel cell stack among the one or more fuel cell stacks, based on the monitored at least one of the amount of accumulated power or the accumulated driving time, performing (S730) a cold start of the representative fuel cell stack, and performing cold starts of the other fuel cell stacks, using power of the representative fuel cell stack, the cold start of which is completed.

The individual monitoring (S710) of the at least one of the amount of accumulated power or the accumulated driving time of the one or more fuel cell stacks may be performed by a monitoring device connected with the one or more fuel cell stacks making up a fuel cell module.

The selecting (S720) of the representative fuel cell stack among the one or more fuel cell stacks, based on the monitored at least one of the amount of accumulated power or the accumulated driving time may be performed by a controller.

As an example, the selecting (S720) of the representative fuel cell stack among the one or more fuel cell stacks may include selecting, by the controller, the representative fuel cell stack among fuel cell stacks connected with a low voltage battery through a bi-directional low voltage DC-DC converter (BLDC).

As an example, the selecting (S720) of the representative fuel cell stack among the one or more fuel cell stacks may include selecting, by the controller, a fuel cell stack, having the highest amount of accumulated power or the longest accumulated driving time, among fuel cell stacks connected with the low voltage battery through the BLDC as the representative fuel cell stack.

The performing (S730) of the cold start of the representative fuel cell stack may be performed by the controller.

As an example, the performing (S730) of the cold start of the representative fuel cell stack may include driving, by the controller, an air compressor individually connected with the fuel cell stack and performing, by the controller, the cold start.

As an example, the performing (S730) of the cold start of the representative fuel cell stack may include performing, by the controller, the cold start of the representative fuel cell stack, using power of the low voltage battery.

The performing (S740) of the cold starts of the other fuel cell stacks, using the power of the representative fuel cell stack, the cold start of which is completed, may be performed by the controller.

As an example, the performing (S740) of the cold starts of the other fuel cell stacks, using the power of the representative fuel cell stack, the cold start of which is completed, may include performing, by the controller, cold start of the representative fuel cell stack, using power of the low voltage battery.

As an example, the performing (S740) of the cold starts of the other fuel cell stacks, using the power of the representative fuel cell stack, the cold start of which is completed, may include determining priorities for cold starts of the one or more fuel cell stacks, based on the at least one of the amount of accumulated power or the accumulated driving time of the one or more fuel cell stacks and controlling, by the controller, cold starts of the one or more fuel cell stacks, based on the priorities for the cold starts.

As an example, the method may further include consuming, by the controller, at least a portion of power, generated by means of the fuel cell stack which is during the cold start, by means of an air compressor connected with a fuel cell stack which is not during the cold start.

As an example, the consuming of the at least a portion of the power, generated by means of the fuel cell stack which is during the cold start, by means of the air compressor connected with the fuel cell stack which is not during the cold start may include consuming, by the controller, the at least a portion of the power, generated by means of the fuel cell stack which is the during the cold start, by means of bypass driving of the air compressor connected with the fuel cell stack which is not during the cold start.

As an example, the method may further include charging, by the controller, a high voltage battery connected with the one or more fuel cell stacks, using the at least a portion of the power generated by means of the fuel cell stack which is during the cold start.

As an example, the method may further include performing, by the controller, the cold starts of the one or more fuel cell stacks, based on power required for the fuel cell module from an upper-level controller.

As an example, the performing of the cold starts of the one or more fuel cell stacks, based on the power required for the fuel cell module from the upper-level controller, by the controller may include determining, by the controller, the number of fuel cell stacks which are cold started, such that the power generated by means of the fuel cell stack which is during the cold start is greater than or equal to the power required for the fuel cell module.

As an example, the performing of the cold starts of the one or more fuel cell stacks, based on the power required for the fuel cell module from the upper-level controller, by the controller may include controlling, by the controller, power of the fuel cell stack, the cold start of which is already completed, based on a value obtained by subtracting the power generated by means of the fuel cell stack which is during the cold start from the power required for the fuel cell module.

As an example, the method may further include determining, by the controller, priorities for cold shutdowns (CSDs) of the one or more fuel cell stacks, based on the at least one of the amount of accumulated power or the accumulated driving time of the one or more fuel cell stacks, and controlling, by the controller, the CSDs of the one or more fuel cell stacks, based on the priorities for the CSDs.

Figure 8:
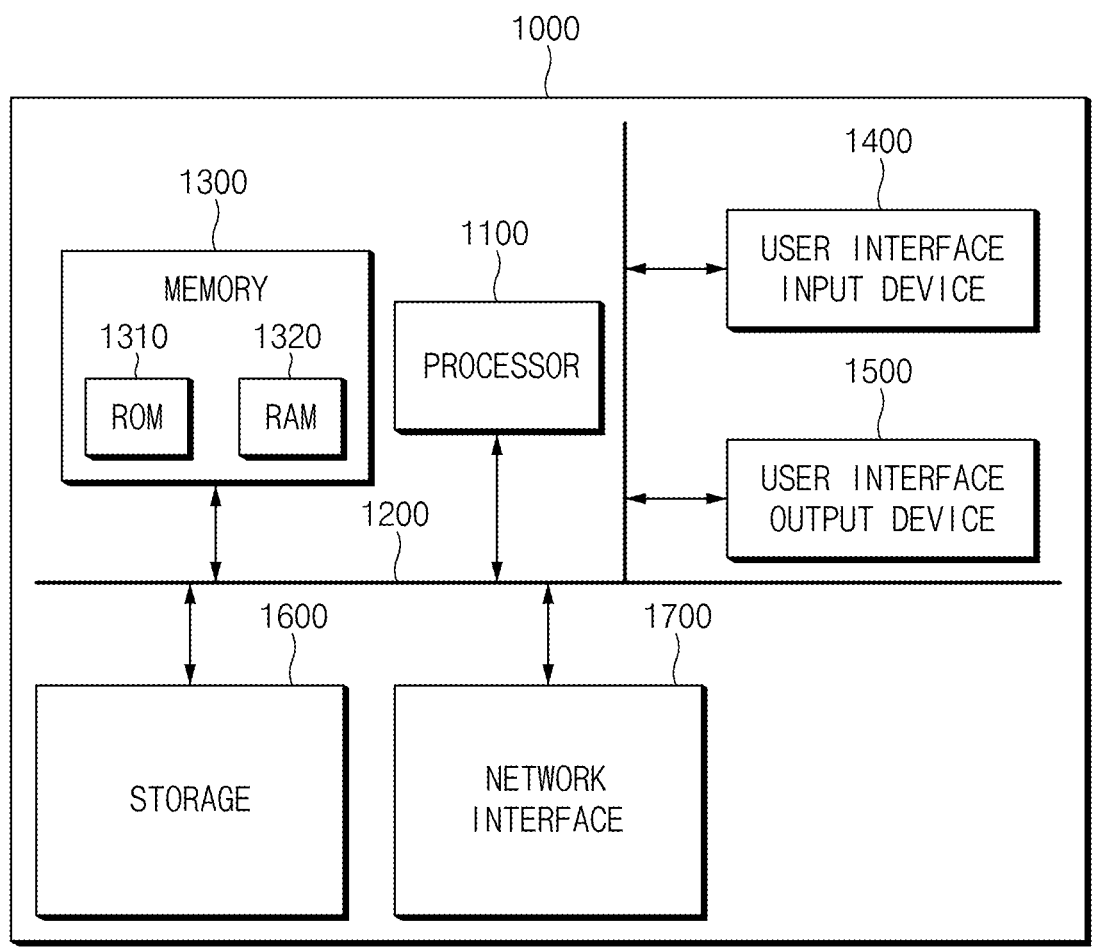
FIG. 8 is a block diagram illustrating a computing system according to an embodiment of the present disclosure.

FIG. 8 is a block diagram illustrating a computing system according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the apparatus for controlling the fuel cell system and the method thereof according to an embodiment of the present disclosure.

According to at least one of embodiments of the present disclosure, the apparatus and the method thereof may be provided to control a cold start and a cold shutdown (CSD) of a fuel cell system.

Furthermore, according to at least one of embodiments of the present disclosure, the apparatus for controlling the fuel cell system and the method thereof may be provided to reduce the number of low voltage batteries and the number of bi-directional low voltage DC-DC converters (BLDCs) used for a multi-module fuel cell generation system and reduce the complexity of control.

Furthermore, according to at least one of embodiments of the present disclosure, the apparatus for controlling the fuel cell system and the method thereof may be provided to improve temperature increase efficiency and make power used for a cold start efficient by first increasing a temperature of a stack with the highest accumulated usage of the fuel cell stack in a cold start situation.

Furthermore, according to at least one of embodiments of the present disclosure, the apparatus for controlling the fuel cell system and the method thereof may be provided to charge a high voltage battery upon a cold start or a CSD.

Furthermore, according to at least one of embodiments of the present disclosure, the apparatus for controlling the fuel cell system and the method thereof may be provided to address a problem in which the sum of power is able to be greater than required power upon minimum power control by driving a representative fuel cell stack in the module or some fuel cell stacks with high priorities if necessary.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for controlling a fuel cell system, the apparatus comprising:
   a monitoring device connected with one or more fuel cell stacks of a fuel cell module, the monitoring device being configured to individually monitor at least one of: an amount of accumulated power and/or an amount of accumulated driving time of each fuel cell stack of the one or more fuel cell stacks; and
   a controller configured to: (a) select a representative fuel cell stack among the one or more fuel cell stacks based on the amount of accumulated power or the amount of accumulated driving time, (b) perform a cold start of the selected representative fuel cell stack, and/or (c) perform cold starts of at least one of the remaining fuel cell stacks of the one or more fuel cell stacks using power of the selected representative fuel cell stack after the cold start of the selected representative fuel cell stack is completed.

2. The apparatus of claim 1, further comprising:
   one or more air compressors, each air compressor of the one or more air compressors being individually connected to each fuel cell stack among the one or more fuel cell stacks,
   wherein the controller is further configured to drive a corresponding air compressor of the one or more air compressors that is individually connected with a corresponding fuel cell stack of the one or more fuel cell stacks when performing the cold start of the corresponding fuel cell stack.

3. The apparatus of claim 1, further comprising:
   one or more low voltage batteries and one or more bi-directional low voltage DC-DC converters (BLDC), each low voltage battery being connected to a corresponding BLDC of the one or more BLDC, each corresponding BLDC being connected to a corresponding fuel cell stack of the one or more fuel cell stacks,
   wherein the controller is further configured to select the representative fuel cell stack among the one or more fuel cell stacks connected to the corresponding low voltage battery through the corresponding BLDC and perform the cold start of the selected representative fuel cell stack using power of the corresponding low voltage battery.

4. The apparatus of claim 3, wherein the controller is further configured to select a fuel cell stack of the one or more fuel cell stacks having the highest amount of accumulated power and/or the longest accumulated driving time as the representative fuel cell stack.

5. The apparatus of claim 1, wherein the controller is further configured to: determine a prioritization ranking for performing cold starts of the one or more fuel cell stacks, the prioritization ranking being based on the amount of accumulated power or the accumulated driving time of each fuel cell stack of the one or more fuel cell stacks, and perform cold starts of the one or more fuel cell stacks according to the prioritization ranking.

6. The apparatus of claim 1, wherein the controller is configured to consume at least a portion of power generated by the fuel cell stack during the cold start by activating an air compressor connected with a different fuel cell stack.

7. The apparatus of claim 6, wherein the controller is configured to consume the portion of the power generated by the fuel cell stack during the cold start by bypassing driving of the corresponding air compressor connected with the different fuel cell stack.

8. The apparatus of claim 1, wherein the controller is configured to charge a high voltage battery connected with the one or more fuel cell stacks using at least a portion of power generated by the fuel cell stack during the cold start.

9. The apparatus of claim 1, wherein the fuel cell module comprises a number of fuel cell stacks, the number being determined based on a value obtained by dividing power of one fuel cell stack by power necessary for driving of one air compressor.

10. The apparatus of claim 1, wherein the controller is configured to perform cold starts of the one or more fuel cell stacks based on power required for the fuel cell module from an upper-level controller.

11. The apparatus of claim 10, wherein the controller is configured to determine the number of fuel cell stacks being cold started such that power generated by the fuel cell stack during the cold start is greater than or equal to a power requirement for the fuel cell module.

12. The apparatus of claim 10, wherein the controller is configured to power the fuel cell stack after the cold start is completed based on a value obtained by subtracting power generated by the fuel cell stack during the cold start from the power required for the fuel cell module.

13. The apparatus of claim 1, wherein the controller is configured to determine priorities for cold shutdowns (CSDs) of the one or more fuel cell stacks based on at least one of: the amount of accumulated power and/or the accumulated driving time of the one or more fuel cell stacks, and
wherein the controller is further configured to perform the CSDs of the one or more fuel cell stacks based on the priorities for the CSDs.

14. A method for controlling a fuel cell system, the method comprising:
individually monitoring, by a monitoring device connected with one or more fuel cell stacks of a fuel cell module, at least one of: an amount of accumulated power and/or an amount of accumulated driving time of the one or more fuel cell stacks;
selecting, by a controller, a representative fuel cell stack among the one or more fuel cell stacks based on the amount of accumulated power and/or the amount of accumulated driving time;
performing, by the controller, a cold start of the selected representative fuel cell stack; and
performing, by the controller, cold starts of at least one of the remaining fuel cell stacks of the one or more fuel cell stacks using power of the selected representative fuel cell stack after the cold start of the selected representative fuel cell stack is completed.

15. The method of claim 14, wherein the selecting of the representative fuel cell stack among the one or more fuel cell stacks by the controller further includes:
selecting, by the controller, the representative fuel cell stack among fuel cell stacks connected with a low voltage battery through a BLDC, and
wherein the performing of the cold start of the representative fuel cell stack by the controller further includes:
performing, by the controller, the cold start of the representative fuel cell stack using power of the low voltage battery.

16. The method of claim 15, wherein the selecting of the representative fuel cell stack among the fuel cell stacks connected with the low voltage battery through the BLDC by the controller further includes:
selecting, by the controller, a fuel cell stack having the highest amount of accumulated power and/or the longest accumulated driving time, among the fuel cell stacks connected with the low voltage battery through the BLDC as the representative fuel cell stack.

17. The method of claim 14, further comprising:
consuming, by the controller, at least a portion of power generated by the fuel cell stack during the cold start via an air compressor connected with a different fuel cell stack.

18. The method of claim 17, wherein the consuming of the at least a portion of the power generated by the fuel cell stack during the cold start further includes:
consuming, by the controller, the portion of the power generated by the fuel cell stack during the cold start by bypassing driving of the air compressor connected with the different fuel cell stack.

19. The method of claim 14, further comprising:
charging, by the controller, a high voltage battery connected with the one or more fuel cell stacks using at least a portion of power generated by the fuel cell stack during the cold start.

20. The method of claim 14, further comprising:
controlling, by the controller, cold starts of the one or more fuel cell stacks based on power required for the fuel cell module from an upper-level controller.

* * * * *